(12) United States Patent
Kim et al.

(10) Patent No.: US 10,698,510 B2
(45) Date of Patent: Jun. 30, 2020

(54) TOUCH SCREEN, TOUCH PANEL AND ELECTRONIC DEVICE HAVING SAME

(71) Applicant: SAMSUNG ELECTRONICS CO., LTD., Suwon-si, Gyeonggi-do (KR)

(72) Inventors: Sang-ho Kim, Hwaseong-si (KR); Seung-jin Oh, Seoul (KR); Sang-wook Kwon, Seongnam-si (KR); Byung-jik Kim, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 55 days.

(21) Appl. No.: 15/764,590

(22) PCT Filed: Sep. 29, 2016

(86) PCT No.: PCT/KR2016/010925
§ 371 (c)(1),
(2) Date: Mar. 29, 2018

(87) PCT Pub. No.: WO2017/057930
PCT Pub. Date: Apr. 6, 2017

(65) Prior Publication Data
US 2018/0284915 A1 Oct. 4, 2018

Related U.S. Application Data

(60) Provisional application No. 62/236,535, filed on Oct. 2, 2015.

(30) Foreign Application Priority Data

Apr. 1, 2016 (KR) .......... 10-2016-0040403

(51) Int. Cl.
*G06F 3/041* (2006.01)
*G06F 3/044* (2006.01)
*G06F 3/046* (2006.01)

(52) U.S. Cl.
CPC .......... *G06F 3/041* (2013.01); *G06F 3/044* (2013.01); *G06F 3/046* (2013.01);
(Continued)

(58) Field of Classification Search
CPC .......... G06F 3/041; G06F 3/044; G06F 3/046; G06F 2203/04106; G06F 2203/04105; G06F 2203/04101; G06F 2203/04103
See application file for complete search history.

(56) References Cited

U.S. PATENT DOCUMENTS 8,575,823 B2  11/2013  Nishikubo
9,200,970 B2  12/2015  Kodani et al.
(Continued)

FOREIGN PATENT DOCUMENTS

JP  2015-162153  9/2015
KR  10-0766627  10/2007
(Continued)

OTHER PUBLICATIONS

International Search Report for PCT/KR2016/010925, dated Dec. 26, 2016, 5 pages.
(Continued)

*Primary Examiner* — Brent D Castiaux
(74) *Attorney, Agent, or Firm* — Nixon & Vanderhye, P.C.

(57) ABSTRACT

A touch screen is disclosed. The touch screen comprises: a display panel displaying an image; and a touch panel detecting a touch of a user, wherein the touch panel comprises a 2D/3D touch pattern layer having a 2D touch electrode pattern and a 3D touch electrode pattern disposed on both sides of a substrate.

13 Claims, 11 Drawing Sheets

(52) U.S. Cl.
CPC .............. *G06F 2203/04101* (2013.01); *G06F 2203/04103* (2013.01); *G06F 2203/04105* (2013.01); *G06F 2203/04106* (2013.01)

(56) References Cited

U.S. PATENT DOCUMENTS

| | | | |
|---|---|---|---|
| 9,297,831 | B2 | 3/2016 | Ahn et al. |
| 9,671,865 | B2 | 6/2017 | Modarres et al. |
| 9,818,928 | B2 | 11/2017 | Park et al. |
| 9,898,139 | B2 | 2/2018 | Lee et al. |
| 2009/0002199 | A1 | 1/2009 | Lainonen et al. |
| 2009/0322496 | A1 | 12/2009 | da Costa |
| 2011/0043454 | A1 | 2/2011 | Modarres et al. |
| 2011/0187674 | A1* | 8/2011 | Baker .................. G01L 1/10 345/174 |
| 2011/0261021 | A1 | 10/2011 | Modarres et al. |
| 2012/0019449 | A1 | 1/2012 | Yilmaz et al. |
| 2012/0086651 | A1 | 4/2012 | Kwon et al. |
| 2012/0092284 | A1* | 4/2012 | Rofougaran ............ G06F 3/017 345/173 |
| 2013/0027339 | A1 | 1/2013 | Kodani et al. |
| 2013/0082970 | A1 | 4/2013 | Frey et al. |
| 2013/0155005 | A1 | 6/2013 | Liang |
| 2013/0285970 | A1 | 10/2013 | Ahn et al. |
| 2014/0055394 | A1 | 2/2014 | Park et al. |
| 2014/0060210 | A1 | 3/2014 | Jeon et al. |
| 2014/0152618 | A1 | 6/2014 | Ando |
| 2014/0152623 | A1 | 6/2014 | Lee et al. |
| 2014/0210313 | A1 | 7/2014 | Kim et al. |
| 2014/0247227 | A1 | 9/2014 | Jiang et al. |
| 2014/0362304 | A1 | 12/2014 | Wang et al. |
| 2015/0122625 | A1 | 5/2015 | Seo |
| 2015/0154885 | A1 | 6/2015 | Livermore-Clifford et al. |
| 2015/0165479 | A1 | 6/2015 | Lasiter et al. |
| 2015/0331517 | A1 | 11/2015 | Filiz et al. |
| 2015/0339001 | A1 | 11/2015 | Zirkl et al. |
| 2016/0018893 | A1 | 1/2016 | Choi et al. |
| 2016/0054835 | A1* | 2/2016 | Heo .................. G06F 3/0412 345/173 |
| 2016/0224182 | A1 | 8/2016 | Kano et al. |
| 2016/0231857 | A1 | 8/2016 | Kano et al. |
| 2016/0299606 | A1 | 10/2016 | Go |
| 2017/0371461 | A1 | 12/2017 | Lee et al. |

FOREIGN PATENT DOCUMENTS

| | | |
|---|---|---|
| KR | 10-2011-0105455 | 9/2011 |
| KR | 10-1109226 | 1/2012 |
| KR | 10-2012-0073140 | 7/2012 |
| KR | 10-2013-0005297 | 1/2013 |
| KR | 10-2013-0045222 | 5/2013 |
| KR | 10-2013-0085201 | 7/2013 |
| KR | 10-2013-0116167 | 10/2013 |
| KR | 10-2014-0032093 | 3/2014 |
| KR | 10-2014-0070150 | 6/2014 |
| KR | 10-2014-0096644 | 8/2014 |
| KR | 10-1457336 | 11/2014 |
| KR | 101457336 B1 * | 11/2014 |
| KR | 10-2015-0032028 | 3/2015 |
| KR | 10-2015-0047506 | 5/2015 |
| KR | 10-2015-0052554 | 5/2015 |
| KR | 10-1526043 | 6/2015 |
| KR | 10-2015-0080480 | 7/2015 |
| WO | WO 99/38149 | 7/1999 |
| WO | WO 2015/077200 | 5/2015 |

OTHER PUBLICATIONS

Written Opinion of the ISA for PCT/KR2016/010925, dated Dec. 26, 2016, 15 pages.
International Search Report for PCT/KR2016/010945, dated Jan. 3, 2017, 7 pages.
Written Opinion of the ISA for PCT/KR2016/009842, dated Dec. 14, 2016, 11 pages.
Office Action for U.S. Appl. No. 15/277,282, filed Sep. 27, 2016, dated Jan. 12, 2018, 17 pages.
Tsuji et al., "A Layered 3D Touch Screen Using Capacitance Measurement", IEEE Sensors Journal, vol. 14, No. 9, Sep. 2014, pp. 3040-3045.
Hu et al., "3D Gesture-Sensing System for Interactive Displays Based on Extended-Range Capacitive Sensing", ISSCC 2014 / Session 12 / Sensors, MEMS, and Displays / 12.2, pp. 212-214.
Du et al., "A 2.3mW 11cm-Range Bootstrapped and Correlated-Double-Sampling (BCDS) 3D Touch Sensor for Mobile Devices", ISSCC 2015 / Session 6 / Image Sensors and Displays / 6.7, pp. 122-124.
Yan, "3D Sensor for High Resolution Touch Panel Using Bootstrapped Oscillator-based Self-Capacitance Sensing", UCLA Electronic Theses and Dissertations, Acceptance Date 2014, 64 pages.
Le Goc et al., "A Low-cost Transparent Electric Field Sensor for 3D Interaction on Mobile Devices", HAL Archives-Ouvertes, HAL Id: hal-00973234, https://hal.inria.fr/hal-00973234, Submitted on Apr. 4, 2014, 5 pages.
Grinvals, "Gesture recognition for Smartphones/Wearables", ETCzürich, powerpoint presentation, 64 pages.
Office Action dated Nov. 29, 2018 in U.S. Appl. No. 15/277,282.
Final Office Action dated Apr. 3, 2019 in U.S. Appl. No. 15/277,282.
Office Action dated Jul. 20, 2018 in U.S. Appl. No. 15/277,282.
Office Action dated Sep. 5, 2019 in U.S. Appl. No. 15/277,282.

* cited by examiner 1100-1

(a)

1100-2

(b)

(a)

(b)

1100-3

1100-4

(a)

(b)

(a)

(b)

TOUCH SCREEN, TOUCH PANEL AND ELECTRONIC DEVICE HAVING SAME

This application is the U.S. national phase of International Application No. PCT/KR2016/010925 filed 29 Sep. 2016, which designated the U.S. and claims the benefit of U.S. Provisional Application No. 62/236,535, filed 2 Oct. 2015, and claims priority to KR Patent Application No. 10-2016-0040403 filed 1 Apr. 2016, the entire contents of each of which are hereby incorporated by reference.

TECHNICAL FIELD

The disclosure relates to a touch screen, a touch panel and an electronic device comprising the same, and more particularly, to a touch screen enabling 2D touch and 3D touch, a touch panel and an electronic device comprising the same.

BACKGROUND ART

The development of the electronic technology has enabled development and distribution of various types of electronics devices. Recently, various electronic devices such as mobile phones, tablet PCs, TVs or the like are equipped with touch screens, and a user may control functions of the electronic devices using the touch screens.

For example, a user may touch the touch screen by using a pen-shaped input device as well as his body (e.g., fingers or the like), and the electronic device may perform various control operations according to coordinates of a touch made on the touch screen with the finger of the user, the touch pen or the like, and menu (or icon) displayed on the touched coordinate.

Continuous development of the touch technology described above leads to development of 3D touch technology that enables a user to touch an object included in a dimensional image in a 3D dimensional space, and a force touch technology that senses touch pressure of a user provided on the touch screen and provides a touch experience to various users.

However, the various touch technologies described above may not be easily implemented on one electronic device. For example, a related technology has problems such as increased thickness of a touch panel, since RX and TX patterns are configured as two or more separate layers. Further, fabrication time and cost also increase as more via holes are required to implement 2D and 3D touch technologies on one device. Accordingly, it is even more difficult to implement the 2D and 3D finger touch technologies of a user in conjunction with the pen touch technology on one electronic device.

SUMMARY

Accordingly, an object of the present disclosure is to provide a touch screen in which various touch technologies such as 2D and 3D touch patterns, force touch, pen touch or the like may be easily implemented on one device, a touch panel and an electronic device comprising the same.

In order to accomplish the above-mentioned objects, the present disclosure provides a touch screen including a display panel configured to display image and a touch panel configured to sense user's touch, wherein the touch panel includes a 2D/3D touch pattern layer in which a 2D touch electrode pattern and a 3D touch electrode pattern are disposed on both sides of a substrate.

Further, the 2D touch electrode pattern and the 3D touch electrode pattern include electrode pattern in a first direction and electrode pattern in a second direction different from the first direction, in which the electrode pattern in the first direction may be disposed on one side of the substrate, and the electrode pattern in the second direction may be disposed on the other side of the substrate.

Further, the electrode pattern in the first direction may be a horizontal pattern of the 2D touch electrode, a transmission Tx pattern of the 3D touch electrode, and a portion of a reception Rx pattern of the 3D touch electrode, and the electrode pattern in the second direction may be a vertical pattern of the 2D touch electrode and the other portion of reception Rx pattern of the 3D touch electrode.

Further, the 2D electrode pattern and the 3D electrode pattern may be disposed without a via hole on the substrate.

Further, the reception Rx pattern of the 3D touch electrode may be disposed on an edge region of the substrate, and the transmission Tx pattern of the 3D touch electrode may be disposed on a central region of the substrate.

Further, the transmission Tx pattern of the 3D touch electrode may be disposed on one of both sides of the substrate in a form of one or more lines having a first direction or a second direction different from the first direction.

Further, the 2D/3D touch pattern layer may be a transparent material and disposed on the display panel.

Further, the 2D/3D touch pattern layer may be integrated with the display panel by at least one of the in-cell method, the on-cell method and the hybrid method.

Further, the touch panel may include a force touch pattern layer configured to sense a pressure of a touch of the user.

Further, the force touch pattern layer may include a transparent piezoelectric film and a transparent electrode, and may be disposed on the display panel.

Further, the touch panel may include a pen touch pattern layer configured to sense a pen touch of a user.

Meanwhile, an electronic device according to an embodiment may include a touch screen including a touch panel and a display panel, and a processor configured to control the electronic device according to a position of a touch on the touch screen when the touch is sensed on the touch screen, wherein the touch panel includes a 2D/3D touch pattern layer in which a 2D touch electrode pattern and a 3D touch electrode pattern are disposed on both sides of a substrate.

Meanwhile, a touch panel according to an embodiment includes a 2D/3D touch pattern layer in which a 2D touch electrode pattern and a 3D touch electrode pattern are disposed on both sides of a substrate. The 2D touch electrode pattern and the 3D touch electrode pattern include an electrode pattern in a first direction and electrode pattern in a second direction different from the first direction, and the electrode pattern in the first direction is disposed on one side of the substrate, and the electrode pattern in the second direction is disposed on the other side of the substrate.

According to the above various embodiments, various touch technologies such as 2D and 3D touch patterns, force touch, pen touch or the like may be easily implemented on one electronic device.

BRIEF DESCRIPTION OF THE DRAWINGS

The above and/or other aspects and advantages of the present disclosure will become apparent and more readily appreciated from the following detailed description, taken in conjunction with the accompanying drawings, in which.

DETAILED DESCRIPTION OF EXAMPLE EMBODIMENTS

The embodiments will be described in greater detail below with reference to the drawings after terms used herein are briefly explained.

The terms "include" or "comprise" used herein should be construed as designating presence of characteristics, numbers, processes, operation, constituent elements, compartments or combination thereof described in the specification and should not previously exclude presence or possibility of addition of one or more other characteristics, numbers, processes, operation, constituent elements, compartments or combination thereof.

According to an embodiment, terms "first" and "second" may be used to describe various constituent elements, but the constituent elements should not be limited by the terms. Such terms are used only for the purpose of distinguishing one constituent element from the other constituent elements. Further, according to an embodiment, singular expression includes plural expression unless it obviously indicates different meaning from the plural expression in view of context.

According to an embodiment, a "substrate" indicates an insulating layer in which a touch electrode pattern may be disposed on at least one side of both sides, and is not limited to a separate insulating layer in which only the touch electrode pattern is disposed. For example, when a 2D/3D touch pattern layer is integrated with a display panel by the in-cell or on-cell method, it would be obvious to a person skilled in the art that a TFT substrate or a color filter layer, which is one element constituting the display panel, would serve as a substrate role.

Meanwhile, according to the present disclosure, when specific explanation with respect to a related technology is determined to unnecessarily obscure essence of the present disclosure, further explanation will not be provided herein.

The following will describe the present disclosure more specifically by referring to attached drawings.

Figure 1A:
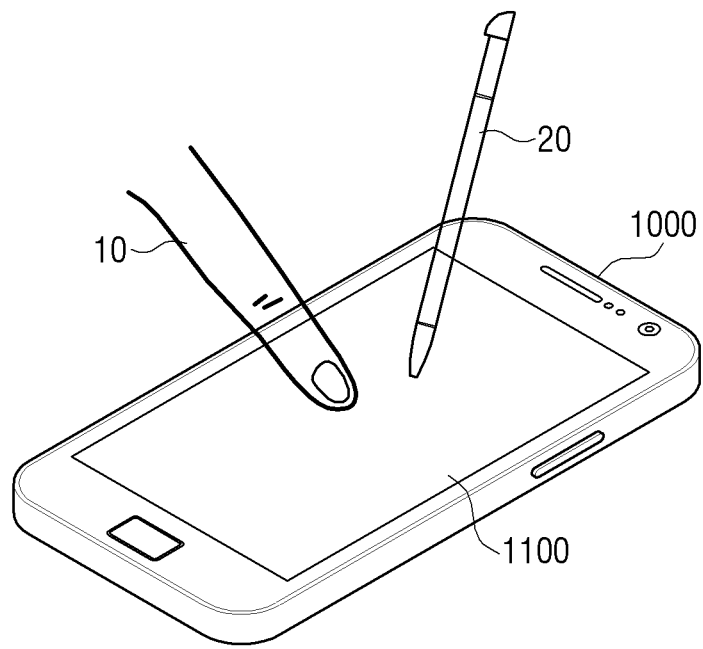
FIGS. 1A and 1B are an exemplary illustration and a block diagram of an electronic device according to an embodiment.

FIG. 1A is an exemplary illustration describing an electronic device including a touch screen according to an embodiment. As illustrated in FIG. 1A, the electronic device 1000 may include the touch screen 1100. In this example, the electronic device 1000 may be a smart phone, but not limited thereto, and accordingly, the electronic device 1000 may be implemented to be various electronic devices such as notebook, monitor, tablet, smart TV, large format display (LFD), touch table or the like.

The electronic device 1000 may sense a touch manipulation of a user and perform various user commands according to the sensed position of the touch when user's touch manipulation is inputted on the touch screen 1100 with a user body 10 or an input device 20.

For example, a user may draw a picture on the touch screen 1100 with a finger 10 or a stylus pen 20, manipulate an object by selecting a 2D or 3D object displayed through the touch screen 1100, or implement an application program corresponding to an object.

Figure 1B:
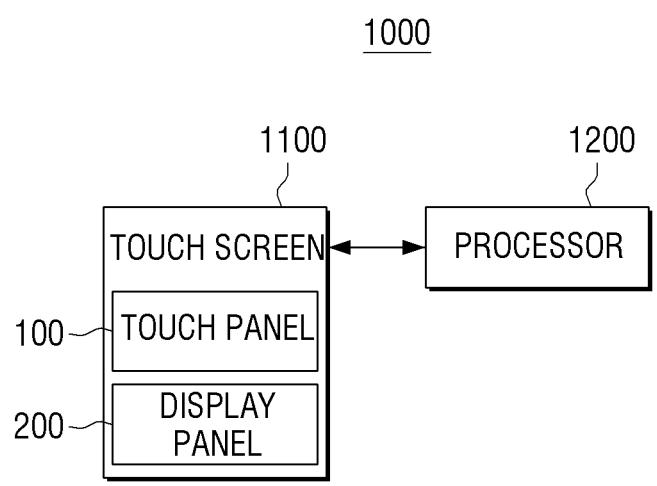

The electronic device 1000 may include the touch screen 1100 and a processor 1200, as illustrated in FIG. 1B. While they are not illustrated in FIG. 1B for convenience of explanation, various units such as storage, communicator, audio output or the like may be included according to type of the electronic device 1000.

The touch screen 1100 senses touch manipulation of a user. Specifically, the touch screen 1100 may receive user commands through touch manipulation of a user, and display an operation of performing processes, or results corresponding to the user commands under the control of the processor 1200.

In this example, the user's touch manipulation may include a 2D touch manipulation in which the user's finger 10 touches the touch screen 1100, a force touch manipulation in which the finger 10 presses the touch screen 1100 after touching, a 3D touch manipulation in which the finger touches space above the touch screen 1100, and a pen touch manipulation using the stylus pen 20.

For the above, according to an embodiment, the touch screen 1100 may include the touch panel 100 and the display panel 200 with the configuration that will be described in detail below with reference to FIG. 2.

The processor 1200 may control the overall operation of the electronic device 1000. Specifically, the processor 1200 may control the operation of the electronic device 1000 according to user manipulation commands through the touch screen 1100.

Specifically, the processor 1200 may determine touch position of a user and control the electronic device 1000 based on the determined touch position, when user's touch manipulation is sensed on the touch screen 1100.

For example, when the user's finger 10 or the stylus pen 20 touches the touch screen 1100 during a picture drawing application, the processor 1200 may determine touch position of a user on the touch screen 1100, and control the touch screen 1100 to render the dots, lines or figures at the determined touch position according to setting of an application.

Further, when the user's finger 10 or the stylus pen 20 touches an object while a 2D or 3D object is displayed on the touch screen 1100, the processor 1200 may control the electronic device 1000 to determine a touch position of a user, select an object present at the determined touch position, and perform operation according to characteristics of the selected object. For example, when the selected object is an icon performing a specific application, the processor 1200 may perform corresponding application.

Further, when a user presses the touch screen 1100 with certain strength, the processor 1200 may sense a touch pressure and perform operation corresponding to the sensed pressure. For example, when a user presses a specific object displayed on the touch screen 1100, the processor 1200 may provide various user interfaces (UI) associated with corresponding object.

The operation of the processor 1200 according to user's touch manipulation described above is merely one of embodiments, and not limited hereto. The processor 1200 may also perform operation corresponding to user's touch manipulation in other various forms according to type or embodiment of the electronic device 1000.

Figure 2:
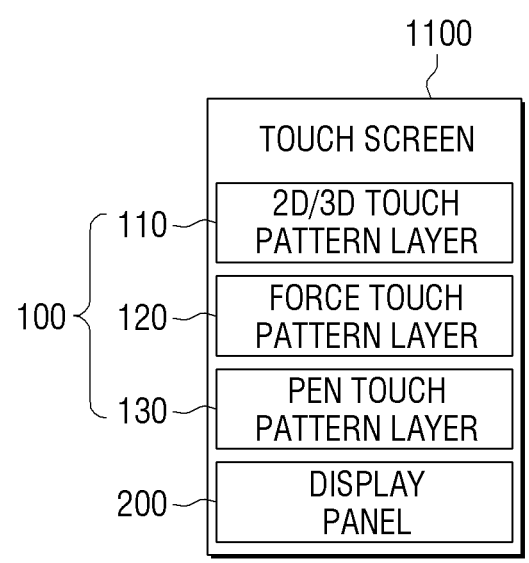
FIG. 2 is a detailed block diagram of a touch screen according to an embodiment.

FIG. 2 is a detailed block diagram of a touch screen according to an embodiment. Referring to FIG. 2, the touch screen 1100 may include a 2D/3D touch pattern layer 110, a force touch pattern layer 120, a pen touch pattern layer 130 and a display panel 200, which constitute a touch panel 100.

The display panel 200 may display image. Specifically, the display panel 200 may display multimedia contents, images, video, texts, or the like. In this example, the display panel 200 may include any of a liquid crystal display (LCD) panel, a plasma display panel (PDP), an organic light emitting diode (OLED), a vacuum fluorescent display (VFD), a field emission display (FED) and an electro luminescence display (ELD).

The touch panel 100 may sense a touch manipulation of a user. Specifically, the touch panel 100 may sense 2D touch manipulation and 3D touch manipulation of a user. In this example, the 2D touch manipulation indicates manipulation of touching the touch screen 1100 made with the body of a user (e.g., finger), and 3D touch manipulation indicates manipulation of positioning the body of a user in a space above the touch screen 1100. In this example, the 3D touch manipulation is called 'touch manipulation' although it does not contact the touch screen 1100 with the body of a user, because the manipulation can cause a similar operation as done by the actual touch, such as selecting a 3D object on the touch screen 1100 and so on.

For the above, the touch panel 100 may include the 2D/3D touch pattern layer 110. Specifically, the 2D/3D touch pattern layer 110 include the 2D touch electrode pattern and the 3D touch electrode pattern disposed on both sides of a substrate.

In this example, the 2D touch electrode pattern and the 3D touch electrode pattern may include an electrode pattern in a first direction and an electrode pattern in a second direction different from the first direction. For example, the 2D touch electrode may include a plurality of transmission Tx electrode patterns in a horizontal direction based on the substrate and a plurality of reception Rx electrode patterns in a vertical direction. Further, the 3D touch electrode may also include at least one transmission Tx electrode pattern and a portion of a reception Rx electrode pattern in a horizontal direction based on the substrate and the other reception Rx electrode patterns in a vertical direction.

Meanwhile, according to an embodiment, with respect to the 2D touch electrode pattern and the 3D touch electrode pattern, the electrode pattern in the first direction may be disposed on one side of the substrate, and the electrode pattern in the second direction may be disposed on the other side of the substrate. Accordingly, in the above embodiment, the 2D touch transmission Tx electrode pattern, the 3D touch transmission Tx electrode pattern, and the 3D touch reception Rx electrode pattern, which are electrode patterns in the horizontal direction, may be disposed on one side of the substrate, and the 2D reception Rx electrode pattern and the other pattern of the 3D touch reception Rx electrode pattern, which are electrode patterns in the vertical direction, may be disposed on the other side of the substrate.

As described above, by dividing the 2D and 3D touch electrode patterns according to directions and disposing them on both sides of the substrate, it is possible to dispose a 2D touch wire and a 3D touch wire on both sides of the substrate without causing interferences. Further, because electrode patterns are accurately divided and disposed on both sides of the substrate according to the direction of the electrode pattern, via holes may not be separately required. In other words, according to an embodiment, the 2D touch electrode pattern and the 3D touch electrode pattern may be disposed on the substrate constituting the 2D/3D touch pattern layer 110 without the via hole.

Meanwhile, constitution and direction of the 2D touch electrode pattern and the 3D touch electrode pattern described above are merely one of embodiments, and may not be limited hereto. For example, the first direction may be a direction from a left upper end to a right lower end based on the substrate and the second direction may be a direction from a right upper end to a left lower end based on the substrate.

Further, according to an embodiment, the reception Rx pattern of the 3D touch electrode constituting the 2D/3D touch pattern layer 110 may be disposed on an edge of the substrate, and the transmission Tx pattern of the 3D touch electrode may be disposed on a center region of the substrate. In this example, the transmission Tx pattern of the 3D touch electrode may be disposed on one of both sides of the substrate in one or more line shapes having the first direction or the second direction.

Meanwhile, according to an embodiment, the 2D/3D touch pattern layer 110 may be formed from a transparent material. In this case, the 2D and 3D touch electrodes may be implemented with indium tin oxide (ITO), metal mesh (copper, silver), PEDOT (Poly(3,4-ethylenedioxythiophene)), carbon nano tube (CNT), graphene, or the like, and the PET film or the glass may be used for the substrate. In this example, thickness of the PET film may be 12 um or greater to provide both flexibility and transparency at the same time.

As described above, when the 2D/3D touch pattern layer 110 is formed with a transparent material, it may be disposed on the display panel 200 when the touch screen is formed. It is possible to save power consumption more than when the 2D/3D touch pattern layer 110 is disposed under the display panel 200.

Meanwhile, the 2D/3D touch pattern layer 110 should not be necessarily formed with the transparent material. Accordingly, the touch pattern may be formed with metal wires such as related copper or silver and flexible printed circuit board (FPCB) or printed circuit board (PCB). In this case, it is preferable to dispose the layer under the display panel 200.

Meanwhile, according to an embodiment, the 2D/3D touch pattern layer 110 may be integrated with the display panel 200 with at least one of the in-cell and on-cell methods. In this example, the in-cell method is a method that inserts the touch electrode into the thin film transistor (TFT) substrate, and the on-cell method is a method that forms the touch electrode under a display polarizing plate or on a color filter layer.

As described above, according to an embodiment, the substrate is an insulating layer which have the touch electrode pattern disposed thereon. The substrate is not limited to only a separate insulating layer with the touch electrode pattern disposed thereon, and accordingly, at least one layer, which forms a thin film transistor substrate or the display panel 200 and serves as an insulating layer, may be also included in a range of the substrate according to an embodiment.

Accordingly, even when the 2D touch electrode pattern and the 3D touch electrode pattern are integrated with the display panel 200 by the in-cell and on-cell methods, a scope of the present disclosure may include a case in which the 2D touch electrode pattern and the 3D touch electrode pattern in the first direction are disposed on one side and the 2D touch electrode pattern and the 3D touch electrode pattern in the second direction are disposed on the other side.

Thickness may be reduced by constituting the 2D/3D touch pattern layer 110 as described above. Therefore, complexation with the force touch pattern layer 120 or the pen touch pattern layer 130 which will be described below, can be facilitated.

According to an embodiment, the touch panel 200 may sense a user's touch through the input device 20 such as stylus pen. For the above, the touch panel 100 may further include a pen touch pattern layer 130 sensing user's touch through the input device 20.

The input device 20 may be variously divided according to method of implementation, such as electrostatic capacitive coupling method, electro magnetic resonance (EMR) method, active method or the like. When implemented by the EMR method, the input device 20 may include a coil for inducing electricity with external magnetic signals. The input device may further include a battery with the active method. Meanwhile, when implemented with the electrostatic capacitive coupling method, the input device 20 may include a conductive tip.

The pen touch pattern layer 130 may sense user's touch input through various means of the input device 20 described above. Specific constitution of the pen touch pattern layer 130 is not related with the essence of the present disclosure, which will not be further explained herein below.

Meanwhile, according to an embodiment, the touch penal 100 may sense a touch pressure with which a user presses the touch screen 1100. For the above, the touch panel 100 may further include the force touch pattern layer 120. In this example, the force touch refers to a touch method of sensing a pressure applied by a user on the touch screen 1100, and performing an operation corresponding to the sensed pressure.

In this example, according to an embodiment, the force touch pattern layer 120 may include a transparent piezoelectric film and a transparent electrode. In this case, the transparent piezoelectric film may be implemented with at least one of the poly lactide acid (PLA) and the polyvinylidene fluoride (PVDF). In this example, the PLA may be the poly-l-lactide acid (PLLA) and the poly-d-lactide acid (PDLA) which are two types of mirror image isomers having chiral molecules. In this example, the mirror image isomers indicate isomers which are mirror images from each other but do not overlap with each other as all of four functional groups adjacent to the carbon have different non-symmetric carbons while physical and chemical characteristics are same as each other. Further, the transparent electrode may be formed from at least one among the ITO, the metal mesh (copper, silver), the PEDOT, the CNT, and the graphene.

When the force touch pattern layer 120 is formed with the transparent material as described above, the pattern layer may be disposed on the display panel 200 when the touch screen is formed, and accordingly, sensitivity may be increased compared to a case in which the force touch pattern layer 120 is disposed under the display panel 200.

Meanwhile, when the force touch pattern layer 120 is formed with a non-transparent material such as non-transparent piezoelectric film, the strain gauge, the electrostatic force touch, or the like, the layer may be preferably disposed under the display panel 200.

Meanwhile, the order of the 2D/3D touch pattern layer 110, the force touch pattern layer 120, the pen touch pattern layer 130, and the display panel 200 illustrated in the embodiment of FIG. 2 does not represent the order in which each of the touch pattern layers 110, 120, 130 and the display panel 200 are arranged, as they may be disposed in various orders in consideration of transparency, power consumption, touch sensitivity or the like of the touch pattern layer.

Meanwhile, the 2D/3D touch pattern layer 110, the force touch pattern layer 120, and the pen touch pattern layer 130 described above may all be included in the touch screen 1100. In this case, by implementing the 3D space touch and the force touch in a depth direction in one device in addition to the 2D touch, complete Z-axis touch that can recognize height and depth of the Z-axis direction may be possibly performed as well as XY coordinate recognition.

Figure 3:
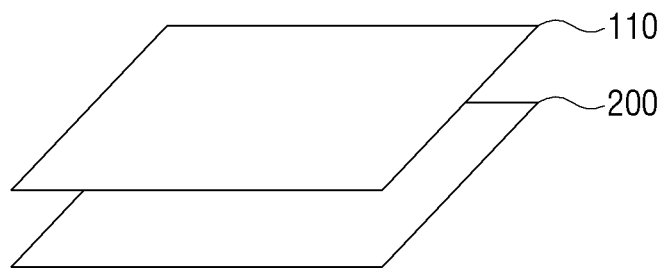
FIG. 3 is an exemplary illustration of a touch screen according to an embodiment.
Figure 3:
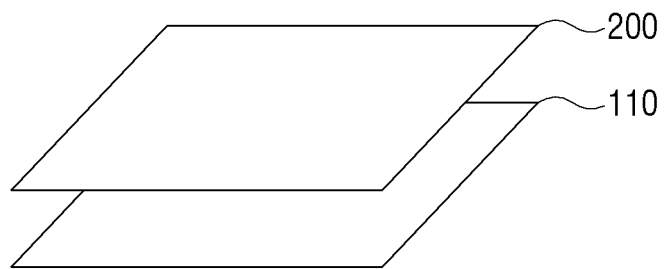

The following will describe embodiments of various touch screens by referring to FIGS. 3 and 10.

FIG. 3 is an exemplary illustration of a touch screen according to an embodiment. Referring to FIG. 3, the touch screen 1100-1, 1100-2 may include a touch panel 100 and a display panel 200 containing a 2D/3D touch pattern layer 110.

Specifically, the touch screen 1100-1 of FIG. 3A includes a transparent material of the 2D/3D touch pattern layer 110, and accordingly, is disposed on the display panel 200. Therefore, consumption power may be saved. Meanwhile, the touch screen 1100-2 of FIG. 3B includes a non-transparent material of the 2D/3D touch pattern layer 110, and accordingly, is disposed under the display panel 200.

Figure 4:
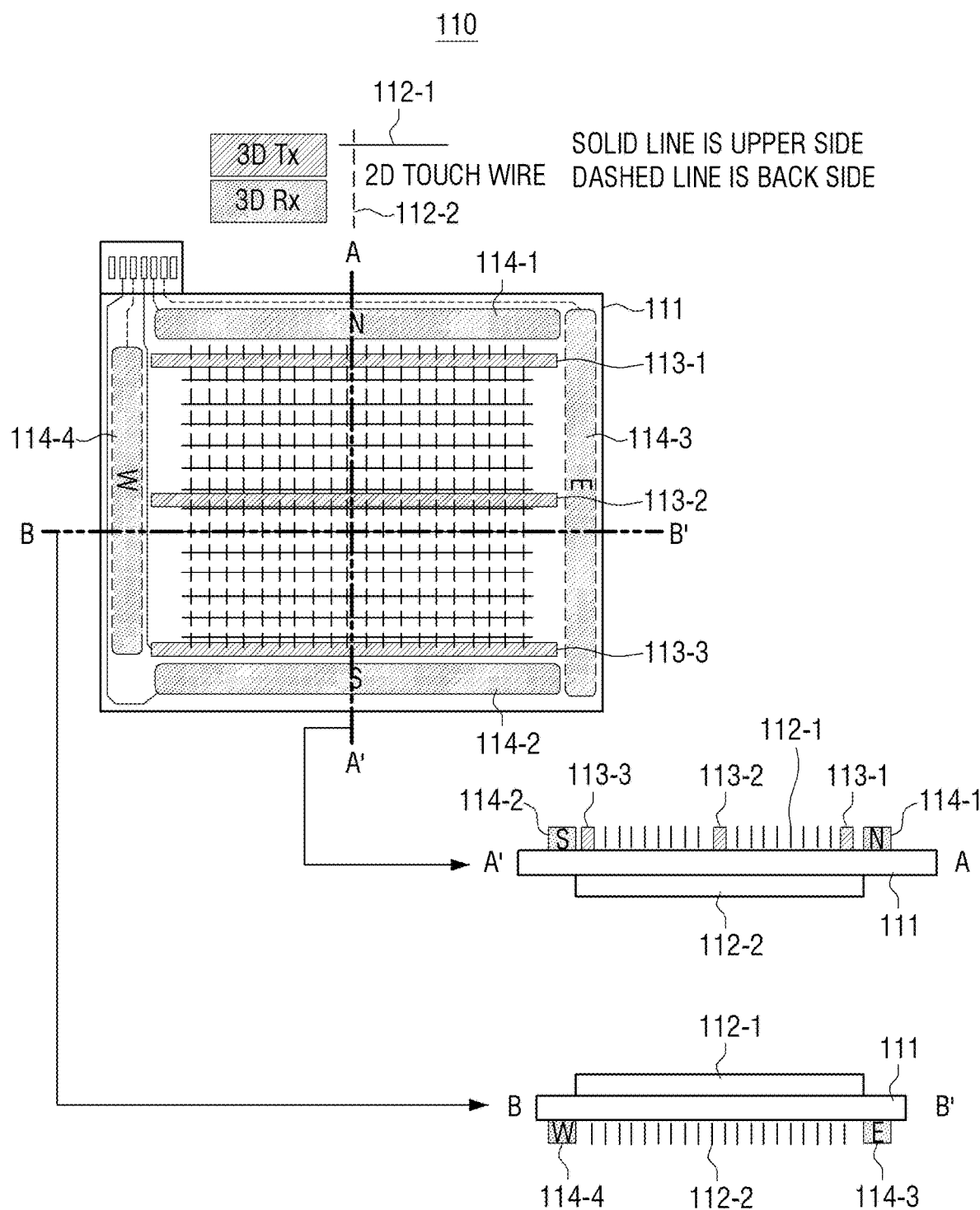
FIGS. 4 and 5 are exemplary illustrations of a 2D/3D touch pattern layer structure according to an embodiment.

FIG. 4 is an exemplary illustration of a 2D/3D touch pattern layer structure according to an embodiment. Referring to FIG. 4, the 2D/3D touch pattern layer 110 may include a substrate 111, 2D touch electrode patterns 112-1, 112-2 and 3D touch electrode patterns 113-1 to 113-3 and 114-1 to 114-4. In this example, one of the horizontal direction pattern 112-1 and the vertical direction pattern 112-2 of the 2D touch electrode may be transmission Tx pattern, and the other may be reception Rx pattern. For convenience of explanation, the following will assume and describe that the horizontal direction pattern 112-1 is 2D touch transmission Tx pattern and the vertical direction pattern 112-2 is 2D touch reception Rx pattern.

Referring to FIG. 4, the touch electrode patterns included in the 2D/3D touch pattern layer 110 may have one direction among the horizontal direction and the vertical direction. Specifically, the transmission Tx pattern 112-1 of the 2D touch electrode, the transmission Tx patterns 113-1 to 113-3 of the 3D touch electrode, and a portion of the reception Rx pattern of the 3D touch electrode have horizontal direction patterns, and the reception Rx pattern 112-2 of the 2D touch electrode and the other portion 114-3, 114-4 of the reception Rx pattern of the 3D touch electrode have vertical direction patterns.

In this case, according to an embodiment, as the electrode pattern in the first direction may be disposed on one side of the substrate and the electrode pattern in the second direction may be disposed on the other side of the substrate, the horizontal direction patterns may be disposed on an upper side of the substrate 111 and the vertical direction patterns may be disposed on a lower side of the substrate 111, as illustrated in FIG. 4.

Therefore, as the 2D and 3D touch electrode patterns are divided according to directions and disposed on both sides of the substrate, interferences between the 2D touch wire and the 3D touch wire can be completely eliminated and additional via hole is also not required.

Meanwhile, as shown in FIG. 4, the reception Rx patterns 114-1 to 114-4 of the 3D touch electrode are disposed on an edge region of the substrate 111 and the transmission Tx patterns 113-1 to 113-3 of the 3D touch electrode are disposed on a central region of the substrate 111.

In this example, the transmission Tx patterns 113-1 to 113-3 of the 3D touch electrode are disposed on an upper side of the substrate 111 in a shape of three lines having a horizontal direction. However, it may not be limited hereto; for example, a shape of one, two or four or more lines may be disposed on an upper side of the substrate 111, or one or more lines having a vertical direction may be disposed on a lower side of the substrate 111.

As described above, shapes, numbers or arrangements of the transmission Tx patterns of the 3D touch electrode may be varied. In this case, the 2D and 3D touch may be implemented without any problem, by simply performing calibration for the different shapes, numbers or arrangements.

Figure 5:
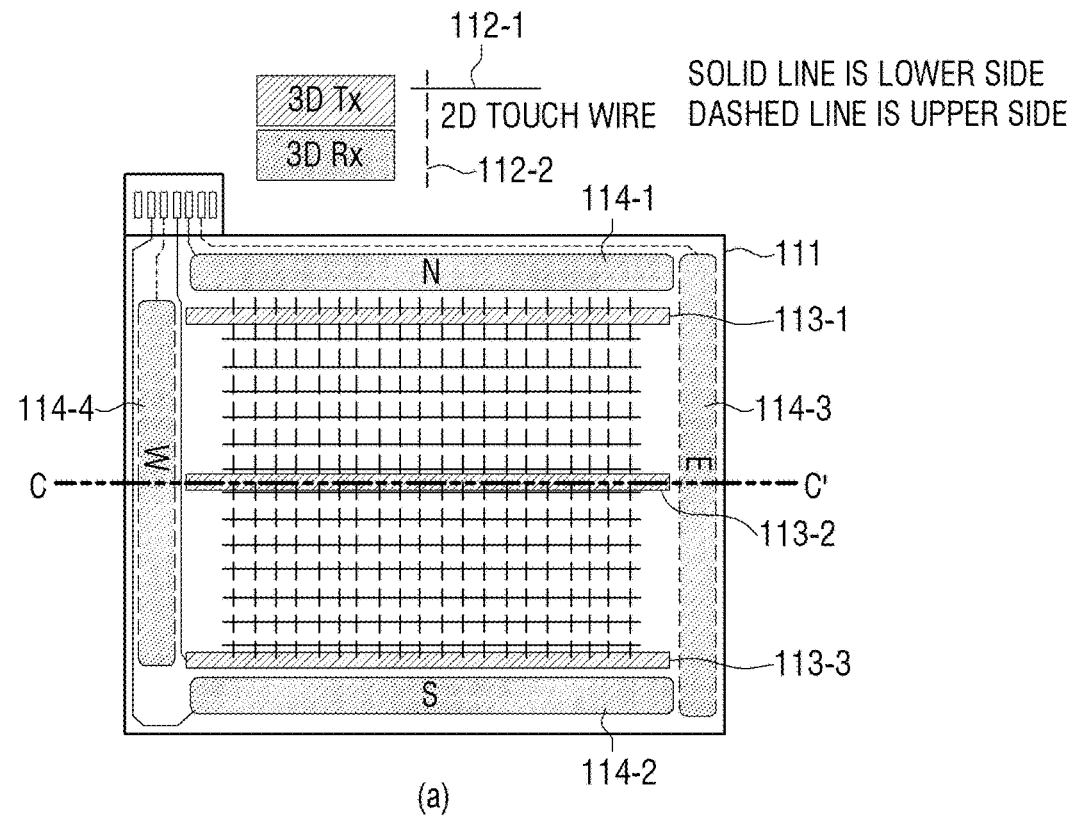
Figure 5:
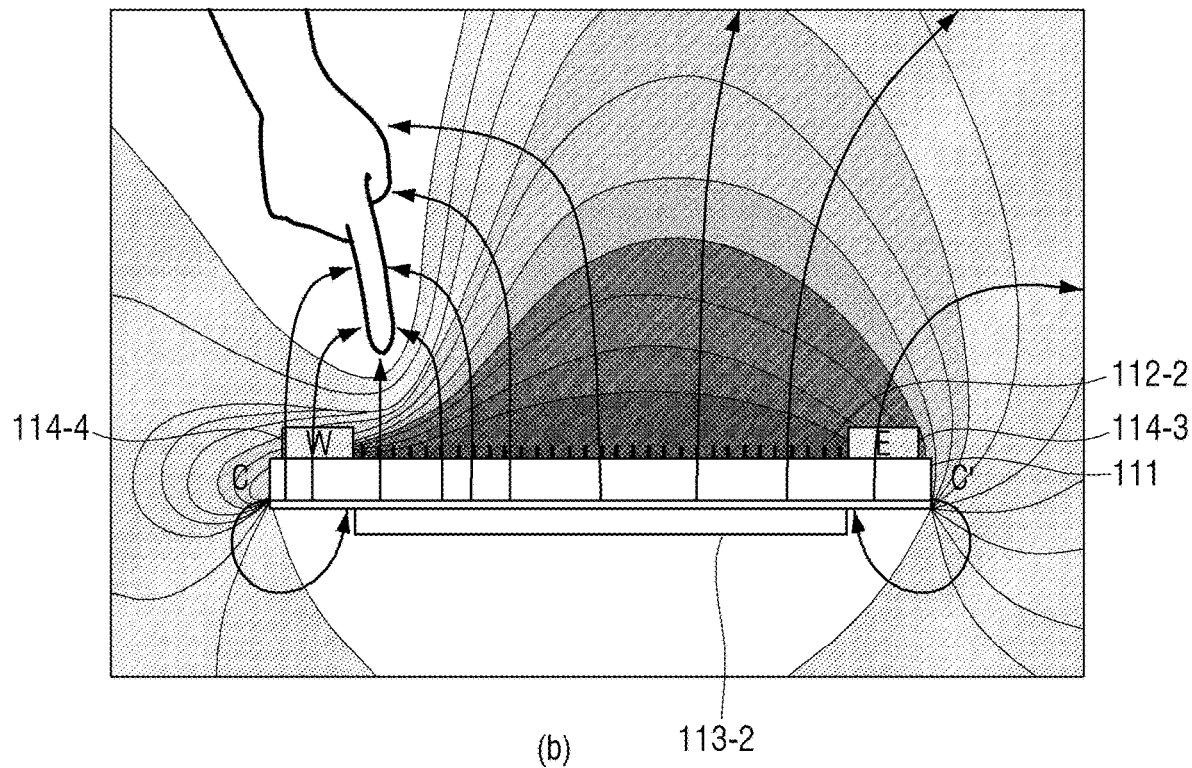

FIG. 5 illustrates an example of the 2D/3D touch pattern layer according to another embodiment. Specifically, referring to FIG. 5A, vertical direction patterns are disposed on an upper side of the substrate 111 and horizontal direction patterns are disposed on a lower side, differently from FIG. 4.

Meanwhile, referring to FIG. 5B, the electric field sensing method is applied for the 3D touch. The electric field sensing method may be called as shunt type in which the electric field is formed from the transmission Tx electrode and the reception Rx electrode, and coordinate position of the space is obtained from a change when the electrostatic capacity changes as the electric field is grounded at the finger.

However, the 3D touch method that can be applied to the present disclosure may not be limited hereto. For example, the projected capacitive touch method, in which space touch is sensed by measuring changes of the electrostatic capacity between the finer and the electrode according to position of the finger, may be applied.

FIG. 6 is an exemplary illustration in which a 2D/3D touch pattern layer 110 is integrated with a display panel 200 according to various embodiments. According to an embodiment, the 2D/3D pattern layer 110 may be integrated with the display panel 200 in the on-cell method, the in-cell method, or the hybrid method.

Figure 6A:
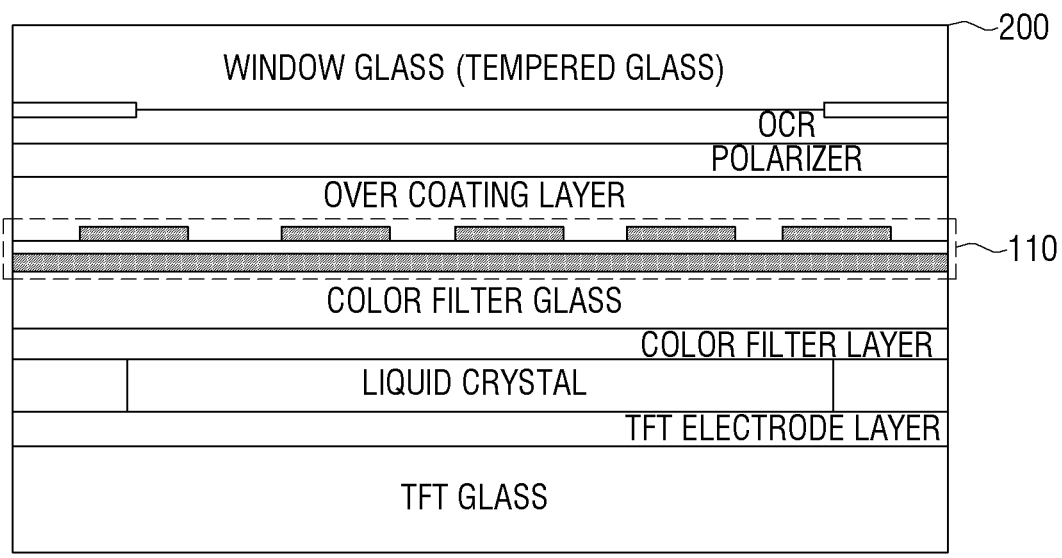
FIGS. 6A, 6B, and 6C exemplary illustrations of a touch screen in which a 2D/3D touch pattern layer is integrated with a display panel according to an embodiment.

The on-cell method is method in which a touch electrode pattern is formed under a polarized substrate or on a color filter layer of the display panel 200, and FIG. 6A illustrates the touch screen 1100-3 in which the 2D/3D touch pattern layer 110 is integrated with the display panel 200 in the on-cell method according to an embodiment.

Figure 6B:
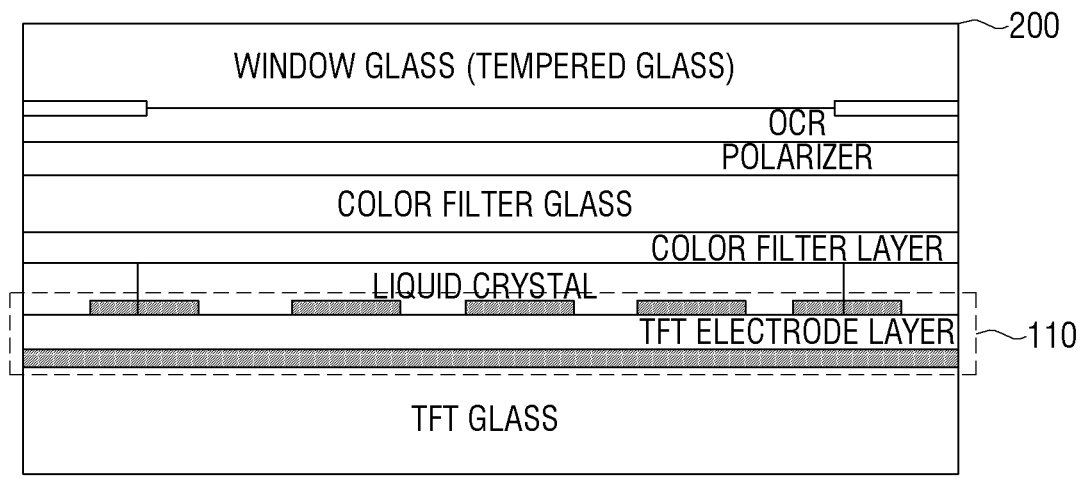

The in-cell method is method in which a touch electrode is formed on a thin film transistor (TFT) substrate of the display panel 200, and FIG. 6B illustrates the touch screen 1100-4 in which the 2D/3D touch pattern layer 110 is integrated with the display panel 200 in the in-cell method according to an embodiment.

Figure 6C:
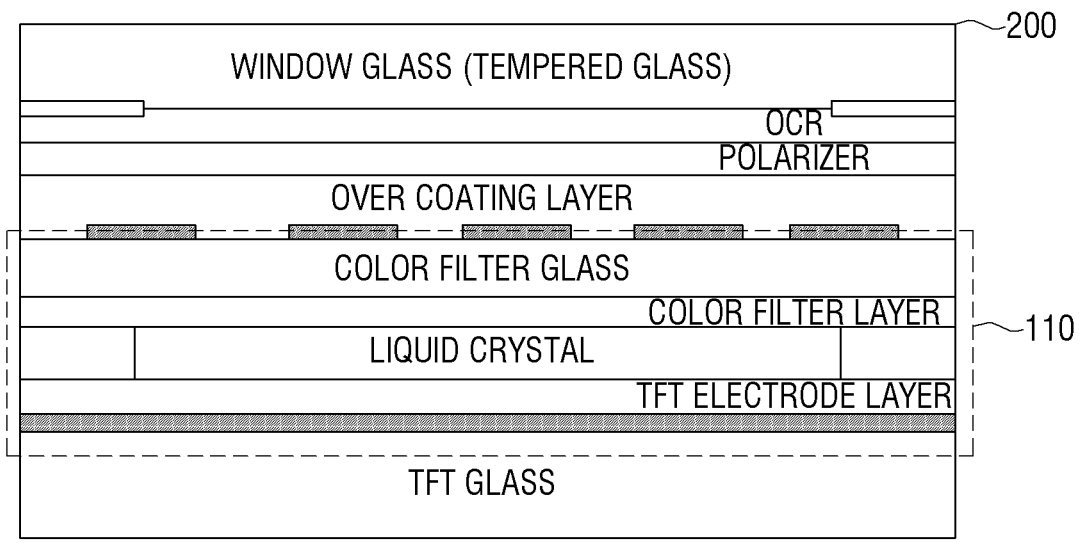
Figure 6C:
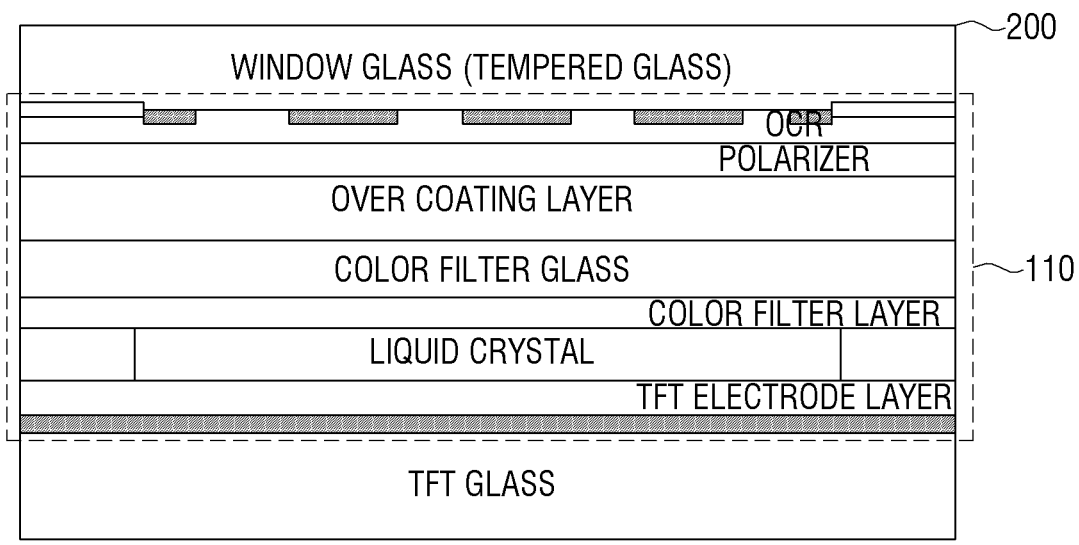

The touch screens 1100-5, 1100-6 illustrated in FIG. 6C represents an embodiment in which the display panel 200 is integrated with the 2D/3D touch pattern layer 110 with the hybrid method, and elements of the display panel 200 serve as a substrate of the 2D/3D touch pattern layer 110.

As described above, the 2D/3D touch pattern layer 110 according to the embodiments may constitute the touch screen 1100 by being integrated with the display panel 200 in various methods, and accordingly, thickness of the touch screen 1100 may be further reduced.

Figure 7:
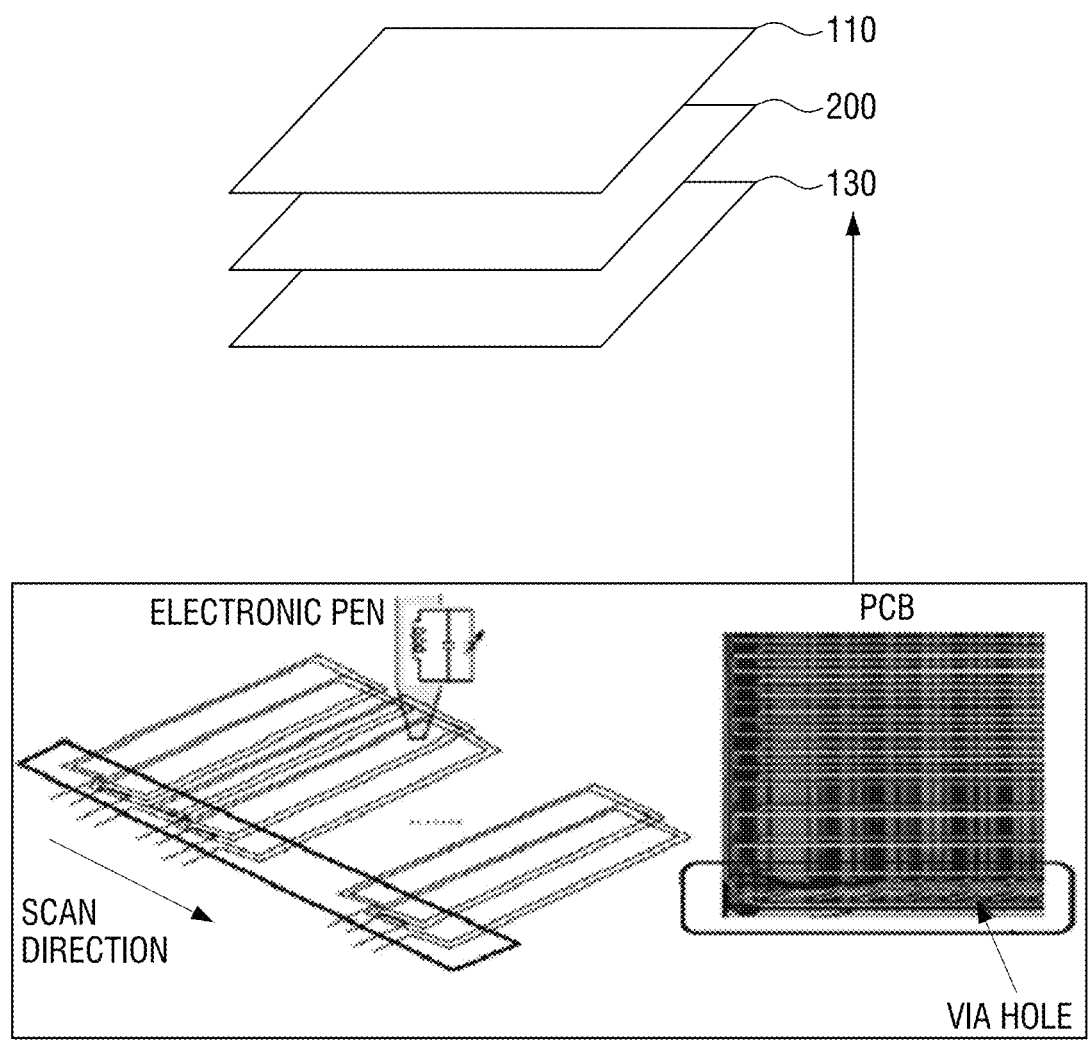
FIG. 7 is an exemplary illustration describing constitution of a touch screen including pen touch pattern layers according to an embodiment.

FIG. 7 is an exemplary illustration describing constitution of a touch screen including a pen touch pattern layer according to an embodiment. As illustrated in FIG. 7, the touch screen 1100-7 may include a 2D/3D touch pattern layer 110, a display panel 120 and a pen touch pattern layer 130.

As described above, with respect to the 2D/3D touch pattern layer 110 according to the embodiments, because 2D touch and 3D touch electrode patterns may be disposed on one substrate 111 without a via hole or by being integrated with the display panel 200, it may easily form additional pen touch pattern for sensing user's touch made through the input device 20 such as stylus pen or the like additionally onto the touch screen.

As illustrated in FIG. 7, the pen touch pattern layer 130 may include a non-transparent printed circuit board (PCB) containing the via hole, and in this case, it may be preferable to be disposed under the display panel 200.

In this example, as described above, the electrostatic capacity coupling method, the electro magnetic resonance (EMR) method, the active method or the like may be used for the pen touch method, and problem such as interference with the 2D/3D touch using the user body will be negligible. When interference becomes problematic, it is obvious to a person skilled in the art that interference is removed through the technology such as palm rejection.

Figure 8:
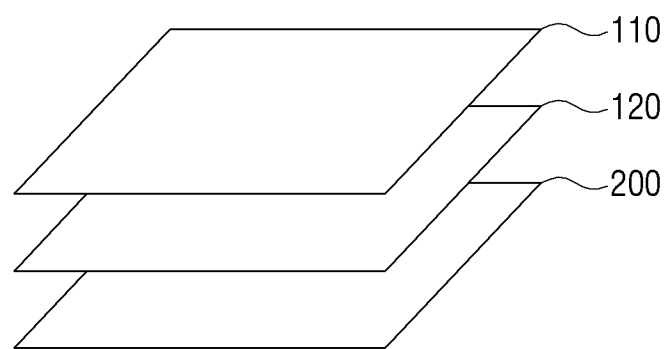
FIG. 8 is an exemplary illustration describing constitution of a touch screen including force touch pattern layers according to various embodiments.
Figure 8:
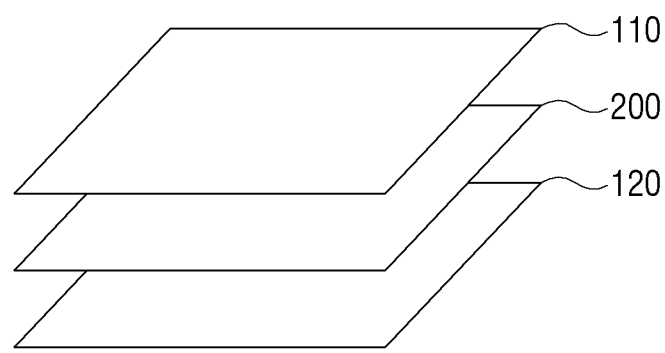

FIG. 8 is an exemplary illustration describing constitution of a touch screen including a force touch pattern layer according to various embodiments. According to an embodiment, the touch screen 1100-8, 1100-9 may include a 2D/3D touch pattern layer 110, a display panel 200 and a force touch pattern layer 120. According to embodiments, the touch pattern layer 120 sensing touch pressure of a user may be easily implemented on the touch screen 1100.

Specifically, when the force touch pattern layer 120 includes a transparent piezoelectric film and a transparent electrode, it may be disposed on the display panel 200. In this example, the force touch pattern layer 120 may be disposed under a transparent material of the 2D/3D touch pattern layer 110 as illustrated in FIG. 8A, but not limited hereto. For example, a transparent material of the force touch pattern layer 120 may be disposed on the 2D/3D pattern layer 110 in order to increase sensitivity to touch pressure.

Further, when the force touch pattern layer 120 is not transparent, e.g., when a non-transparent piezoelectric film is used or the strain gauge or the electrostatic force touch is performed, it may be preferable to be disposed under the display panel 200 as illustrated in FIG. 8B.

Meanwhile, the above exemplifies and describes that the touch panel 100 constitutes the touch screen 1100 with the display panel 200, the electronic device including the above touch screen 1100, but not limited hereto. For example, the touch panel 100 according to various embodiments of the present disclosure may be also implemented on the electronic device 1000 in a touch pad form without including the display panel 200.

According to the above various embodiments, various touch technologies such as 2D and 3D touch pattern, force touch and pen touch may be easily implemented on one electronic device. Specifically, because of structure of the touch screen 1100 according to the various embodiments, various forms of the touch technology may be easily implemented on one electronic device. Particularly, because thickness of the 2D and 3D finger touch pattern structure decreases, it may be easily implemented to be complexation with the pen touch pattern structure and the force touch pattern structure of the depth direction, and accordingly, height and depth touch in a Z-axis direction is possibly performed. Further, because the via hole is not required in the 2D and 3D touch processes, fabrication becomes simple, and accordingly, fabrication cost may be reduced.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

We claim:

1. A touch screen, comprising:
a display panel displaying an image; and
a touch panel sensing a user's touch,
wherein the touch panel comprises a 2D/3D touch pattern layer in which a 2D touch electrode pattern is disposed on both sides of a substrate and a 3D touch electrode pattern is disposed on both sides of the substrate, and
wherein the 3D touch electrode pattern comprises an electrode pattern in a first direction and an electrode pattern in a second direction different from the first direction, the electrode pattern of the 3D touch electrode pattern in the first direction being disposed on one side of the substrate, and the electrode pattern of the 3D touch electrode pattern in the second direction being disposed on the other side of the substrate.

2. The touch screen of claim 1, wherein the 2D touch electrode pattern comprises an electrode pattern in the first direction and an electrode pattern in the second direction, the electrode pattern of the 2D touch electrode pattern in the first direction being disposed on one side of the substrate, and the electrode pattern of the 2D touch electrode pattern in the second direction being disposed on the other side of the substrate.

3. The touch screen of claim 2, wherein the electrode patterns of the 2D and 3D touch electrode patterns in the first direction include a horizontal pattern of the 2D touch electrode, a transmission Tx pattern of the 3D touch electrode, and a portion of a reception Rx pattern of the 3D touch electrode, and
the electrode patterns of the 2D and 3D touch electrode patterns in the second direction include a vertical pattern of the 2D touch electrode and the other portion of the reception Rx pattern of the 3D touch electrode.

4. The touch screen of claim 1, wherein the 2D electrode pattern and the 3D electrode pattern are disposed without a via hole on the substrate.

5. The touch screen of claim 1, wherein a reception Rx pattern of the 3D touch electrode is disposed on an edge region of the substrate, and a transmission Tx pattern of the 3D touch electrode is disposed on a central region of the substrate.

6. The touch screen of claim 5, wherein the transmission Tx pattern of the 3D touch electrode is disposed on one of both sides of the substrate in a form of one or more lines in the first direction or the second direction.

7. The touch screen of claim 1, wherein the 2D/3D touch pattern layer is a transparent material and is disposed on the display panel.

8. The touch screen of claim 1, wherein the 2D/3D touch pattern layer is integrated with the display panel by at least one of in-cell method, on-cell method and hybrid method.

9. The touch screen of claim 1, wherein the touch panel further comprises a force touch pattern layer configured to sense a touch pressure of the user.

10. The touch screen of claim 9, wherein the force touch pattern layer comprises a transparent piezoelectric film and a transparent electrode, and is disposed on the display panel.

11. The touch screen of claim 1, wherein the touch panel further comprises a pen touch pattern layer configured to sense a user pen touch.

12. An electronic device, comprising:
a touch screen comprising a touch panel and a display panel; and
a processor configured to control the electronic device according to a position of a touch on the touch screen when the touch is sensed on the touch screen,
wherein the touch panel comprises a 2D/3D touch pattern layer in which a 2D touch electrode pattern is disposed on both sides of a substrate and a 3D touch electrode pattern is disposed on both sides of the substrate, and
wherein the 3D touch electrode pattern comprises an electrode pattern in a first direction and an electrode pattern in a second direction different from the first direction, the electrode pattern in the first direction being disposed on one side of the substrate, and the electrode pattern in the second direction being disposed on the other side of the substrate.

13. A touch panel, comprising:
a 2D/3D touch pattern layer in which a 2D touch electrode pattern is disposed on both sides of a substrate and a 3D touch electrode pattern is disposed on both sides of the substrate,
wherein the 2D touch electrode pattern comprises an electrode pattern in a first direction and an electrode pattern in a second direction different from the first direction, and the electrode pattern of the 2D touch electrode pattern in the first direction is disposed on one side of the substrate, and the electrode pattern of the 2D touch electrode pattern in the second direction is disposed on the other side of the substrate, and
wherein the 3D touch electrode pattern comprises an electrode pattern in the first direction and an electrode pattern in the second direction, the electrode pattern of the 3D touch electrode pattern in the first direction being disposed on one side of the substrate, and the electrode pattern of the 3D touch electrode pattern in the second direction being disposed on the other side of the substrate.

* * * * *